July 31, 1934.    P. THOMAS    1,968,232
CONVERTIBLE SITTING OR RECLINING QUARTERS FOR MOTOR TRUCK RELIEF DRIVERS
Filed May 24, 1933
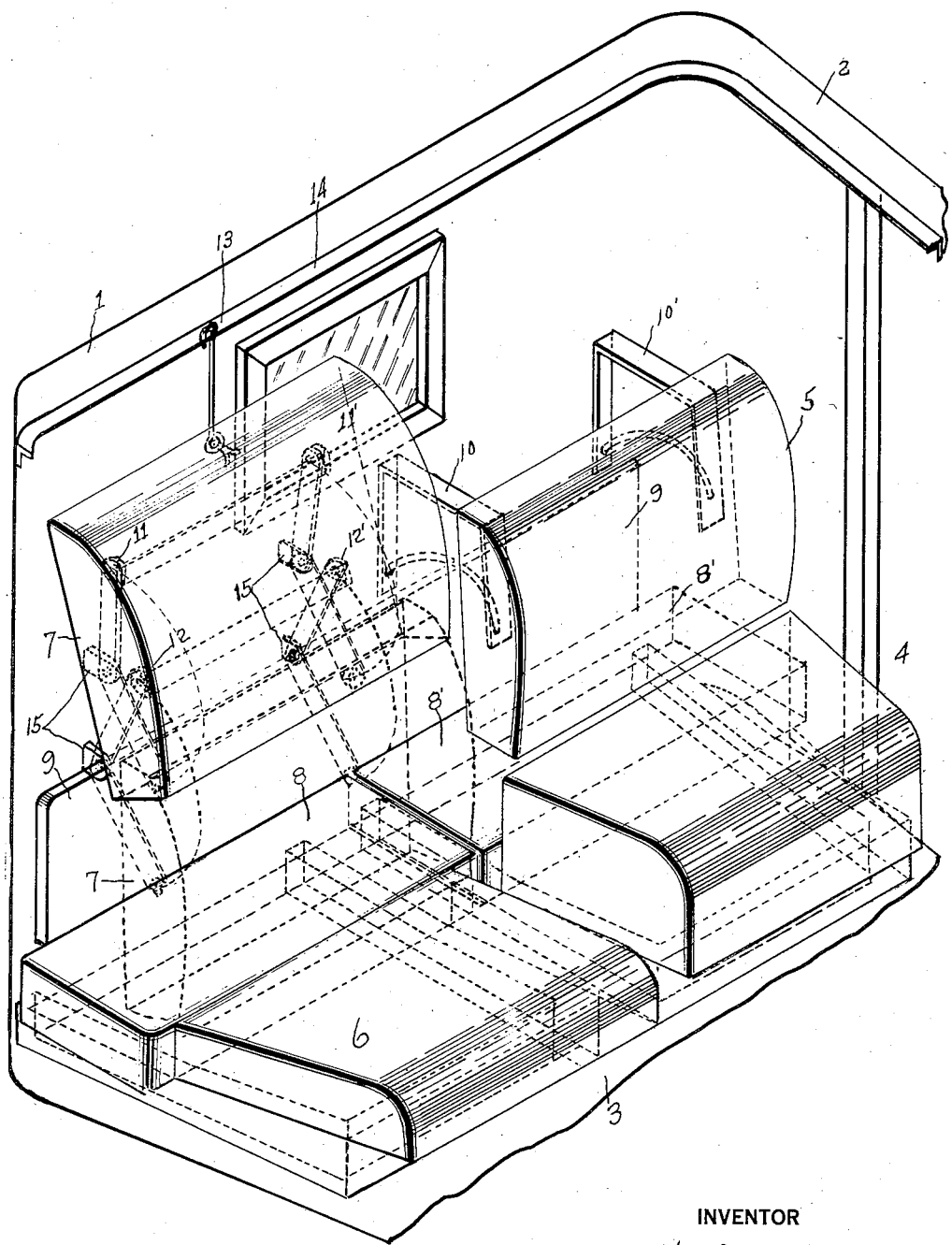
INVENTOR
BY Peter Thomas
ATTORNEY Patented July 31, 1934

1,968,232

UNITED STATES PATENT OFFICE 1,968,232

CONVERTIBLE SITTING OR RECLINING QUARTERS FOR MOTOR TRUCK RELIEF DRIVERS

Peter Thomas, Seattle, Wash.

Application May 24, 1933, Serial No. 672,608

2 Claims. (Cl. 155—7)

This invention relates more particularly to the driver's compartment of motor-trucks that are engaged on long hauls, or cross-country traffic, where it becomes necessary to provide riding and resting quarters for a relief driver.

The main object of the invention is to provide a compartment wherein the relief driver may lie prone, or fully extended, without in any way interfering with the active driver and in no way detracting from the room required in the safe or ordinary operation of the vehicle.

A second object is to provide the resting compartment with the least possible sacrifice of load space and with the minimum increase in the size of the cab, over and above the size required for urban or short-haul service, where one driver only is required.

A further object is to provide the required resting compartment at the minimum of cost and weight.

I accomplish the above objects by an ingenuous arrangement of the parts, such as seat and back cushions, supports for the back cushions, back wall padding and sectional, upholstered bed springs, the latter arranged to remain in position, ready for use at all times, without the inconvenience of moving them from one place to another with relation to the vehicle.

Here-to-fore, it has been the practice to extend the length of the driver's cab, a sufficient distance to provide sleeping space back of the regular seat arrangement. This requires a serious sacrifice of space that should be devoted to the pay-load section of the chassis and besides the sacrifice of space, did not permit of easy access to the resting compartment.

I have found by actual practice that the arrangement shown in my drawing and herein described, does provide adequate resting quarter and permits of quick and easy access to same and that the pay-load portion of the truck is encroached upon less than with any other arrangement.

Referring now particularly to the drawing, which shows by isometric perspective, a section of the driver's compartment of a motor-truck, in this drawing it is assumed that the top is omitted and also the right wall, as well as part of the left side wall and the entire front portion, which in fact, have no bearing whatever upon the invention, which has to do wholly with the section shown.

The numeral 1 represents the rear wall of a motor-truck driver's compartment. 2 is the left side wall, broken away above the door. 3 represents the floor of the same compartment, the top being omitted entirely to facilitate showing the novel construction within. 4 is the active driver's seat, 5 is the suspended back for seat 4. 6 is the relief driver's seat. 7 is the back for seat 6. 8 and 8' are the relief driver's bed cushions. 9 is the padded section of the back wall. 10 and 10' are the brackets to support the driver's seat-back 5. 11 and 11' are the upper strut members that support the relief driver's seat-back 7. 12 and 12' are the lower strut members for the same purpose. 13 is the suspension hook by which the seat-back 7 can be secured to the back angle member 14.

Seat-back 7 is shown in full lines in the position where it would be carried while the relief driver is occupying the bed cushions 8 and 8'. In dotted lines, the seat back 7 is shown down in the position required while the relief driver would be sitting on cushion 6. Further reference to the position of the driver's seat-back 5, will show that it overhangs the bed cushion 8' and that the suspension brackets 10 and 10' are sufficiently high to allow leg room for the relief driver while he is extended prone on cushions 8 and 8' and that there is ample room on cushion 6 for him to change his position and sleep in comfort.

In practice, the bed covering and head pillow are carried in the space back of seat back 5 and additional space is available back of cushion 7 as will be seen by referring to the dotted-in position of same. Space is available between cushions 4 and 6 for thermos cases, so no stops for the purpose of arranging the sleeping quarters or for the purpose of getting at food containers, are required.

The back wall padding should extend approximately twelve inches above the cushions 8 and 8'. The cushions 8 and 8' should be approximately fifteen inches wide, thirty four inches long and five inches thick. They may be made of any material and in any manner that will be appropriate for the purpose and to match the other related parts. The seat back 7 should be approximately twenty two inches high and thirty inches wide, having an appropriately curved surface for a comfortable back support. The carrying struts 11 and 11' and 12 and 12' are preferably made of commercial bar steel, but may be cast from a suitable material. These struts are secured to the cab back 1 by suitable hinge lugs 15 and 15'. The function of the struts being to hold the seat back 7 in the position shown by dotted outline and also to hold it in the position shown by full lines when it is desirable to have same out of the way.

The brackets 10 and 10' may be cast of suitable material, or formed from commercial bar stock. It is understood that a departure from the design shown does not depart from the spirit of the invention. The exact proportions of the parts involved are not to be claimed as part of this invention but the arrangement of the required parts in such a manner as to provide the dual utility of the parts with the minimum of sacrificed space and the minimum of time required for conversion.

Having thus described my invention, what I claim as new and wish to protect by Letters Patent is:—

1. In convertible sitting or reclining quarters for motor-truck relief drivers, within the operating cab of a motor-truck, in which said cab is provided with a rear wall or panel, comprising a driver's seat, a back rest cushion for said seat, means suspending said back-rest cushion from said panel in spaced relation thereto, a second seat adjacent said driver's seat, a back-rest cushion for said second seat, means hingedly mounting said second back-rest cushion upon said panel for movement from its normal service position adjacent the rear edge of said second seat, to a position adjacent said panel and spaced upwardly and rearwardly from said second seat, means for maintaining said second back-rest in said raised position and cushion means behind each of said seats for providing sleeping quarters for a relief driver.

2. In convertible sitting or reclining quarters for motor-truck relief drivers within the operating cab of a motor-truck, in which said cab is provided with a rear wall and equipped with a driver's seat, a back for said seat, brackets attached to said back and secured to the rear wall of the cab to hold said back spaced away from said rear wall, a second seat adjacent said driver's seat, a back rest for said second seat, link members hingedly connecting said second back rest to said rear wall, said second back rest being adapted to swing upwardly and slightly back of its service position, cushion members disposed immediately back of said driver's seat and back of said second seat, approximately on the same horizontal plane as said second seat; a padded panel attached to said back wall, all to form a sleeping bed, crossways of said motor-truck cab.

PETER THOMAS.